US006181370B1

(12) United States Patent
Hinzpeter et al.

(10) Patent No.: US 6,181,370 B1
(45) Date of Patent: Jan. 30, 2001

(54) METHOD AND DEVICE FOR ADJUSTING A STAMP RELATIVE TO A MATRIX WITH SINTER-PRESSING

(75) Inventors: Jürgen Hinzpeter; Ulrich Zeuschner, both of Schwarzenbek; Elke Wittenberg, Gülzow; Peter Lüneburg, Berkenthin; Hans-Joachim Pierags, Reinsbek; Ulrich Arndt, Lauenburg; Stephan Mallon, Kollow; Klaus-Peter Rüβmann, Schwarzenbek, all of (DE)

(73) Assignee: Wilhelm Fette GmbH, Schwarzenbek (DE)

( * ) Notice: Under 35 U.S.C. 154(b), the term of this patent shall be extended for 0 days.

(21) Appl. No.: 09/056,032

(22) Filed: Apr. 6, 1998

(30) Foreign Application Priority Data

Apr. 8, 1997 (DE) ............................................ 197 14 430

(51) Int. Cl.$^{7}$ ...................................................... H04N 7/18

(52) U.S. Cl. ............................................................. 348/95

(58) Field of Search ................................ 348/61, 86, 90, 348/92, 95, 96, 125–135, 143, 6; 156/89.12; 73/60.11, 865.6; 256/354, 394; 419/38; 219/10.55; H04N 7/18

(56) References Cited

U.S. PATENT DOCUMENTS 4,860,096 * 8/1989 Long ..................................... 348/95
4,963,709 * 10/1990 Kimrey, Jr. ....................... 219/10.55
5,463,462 * 10/1995 Ohnishi et al. ...................... 356/354
5,465,610 * 11/1995 Loisel ................................. 73/60.11
5,501,114 * 3/1996 Okamoto et al. ................... 73/865.6
5,535,006 * 7/1996 Telschow et al. ................... 356/394
5,781,230 * 7/1998 Nguyen et al. ...................... 348/128
5,881,357 * 3/1999 Takemoto et al. ..................... 419/38
5,935,358 * 8/1999 Yamasaki .......................... 156/89.12
5,970,310 * 10/1999 Satoh et al. .............................. 348/6

FOREIGN PATENT DOCUMENTS 34 25 221 C2 1/1985 (DE) .

* cited by examiner

*Primary Examiner*—Chris S. Kelley
*Assistant Examiner*—Tung Vo
(74) *Attorney, Agent, or Firm*—Vidas, Arrett & Steinkraus, P.A.

(57) ABSTRACT

A method for adjusting a stamp relative to a matrix on sinter-pressing, characterized by the following method steps:

the stamp and the matrix are so moved towards one another that the stamp is located in a position shortly before the immersing into the bore of the matrix;

the region of the stamp is illuminated;

on the side distant to the stamp there is positioned an optical recorder which acquires the matrix bore;

the picture recorded by the recorder is imaged on a monitor;

in accordance with the imaging on the monitor the stamp relative to the matrix is so adjusted transversely to its axis that a uniform gap between the stamp and the matrix bore over the circumference is obtained; and subsequently the stamp is finally fixed in its receiver.

3 Claims, 2 Drawing Sheets

METHOD AND DEVICE FOR ADJUSTING A STAMP RELATIVE TO A MATRIX WITH SINTER-PRESSING

BACKGROUND OF THE INVENTION

The invention relates to a method for adjusting a stamp relative to a matrix with sinter-pressing, according to the introductory part of claim 1.

With sinter-pressing, but also with other pressing or punching the stamp must be adjusted relative to the matrix bore or matrix recess. It is desirable for a uniform as possible gap, i.e. play between the stamp and matrix. The more exact the positioning of the stamp, the more uniform is also the play between the stamp and the matrix seen over the circumference.

If between the stamp and the matrix there is for example play present with sinter-pressing, a burr even if very slight, cannot be avoided. A burr formation is not desirable with pressed parts, in particular with such pressed parts which are subsequently not coated. It is known for example to manufacture cutting plates for milling, turning and drilling tools with the sintering method. It is further also known to coat such pressed parts with a layer of hard material. If then the pressed part comprises a burr there exists the danger that the burr breaks and by way of this at important locations, specifically the cutting edges, the required hardness is not longer met. On the contrary the tool wears particularly rapidly. In order to counteract such consequences a removal of the burr is required.

It is known to allocate suitable adjusting means to the stamp in order to align this transversely to the longitudinal axis opposite the matrix. Conventionally the alignment is effected visually, where appropriate with a magnifying glass.

BRIEF SUMMARY OF THE INVENTION

It is the object of the invention to provide a method for adjusting a stamp relative to a matrix with sinter-pressing, with which a smaller and more uniform gap over the circumference may be realized.

This object is achieved by the features of patent claim 1.

The method according to the invention relates to sinter-pressing which operates with an upper stamp and a lower stamp, i.e. with which there is provided a matrix through-bore. On manufacturing the pressed parts, the lower stamp is usually located in the matrix bore whilst the upper stamp frees this bore so that powder can be introduced from above. Subsequently the upper stamp is inserted into the matrix bore with a given force and over a given distance, where appropriate with the simultaneous actuation of the lower stamp.

For adjusting or trimming such an arrangement the stamp is moved towards the matrix bore until it is in a position shortly before the immersing. The region of the stamp is illuminated and on the side of the matrix distant to the stamp an optical recorder is positioned which acquires the matrix bore. It is to be understood that for this purpose the lower stamp is withdrawn so far from the matrix that an optical recorder may be positioned below the matrix bore. With the help of the optical recorder the matrix bore is acquired and imaged on a monitor.

The diameter of the stamp is for obvious reasons minimally smaller than the diameter of the matrix bore so that the stamp may move relatively freely in this. For this reason there exists a gap between the stamp and the walling of the matrix bore, even if this gap is extremely small. Such a gap may be acquired by the optical recorder if there is sufficient brightness available. The gap is then imaged on a monitor so that the operating person, with the help of an adjusting device for the stamp known per se, may adjust this stamp to the extent that a uniform gap thickness over the circumference is obtained. Subsequently the stamp is finally fixed at its receiver, for example with the help of a suitable clamping device.

With the help of the method according to the invention a uniform gap may be adjusted with the result that on the pressed part there arises a uniform slight burr which can be more easily dealt with on flier treatment than a one-sided burr formation. The method according to the invention furthermore has the advantage that a minimal play may be realized without the danger of there being foulings with the walling of the bore of the matrix.

The device for carrying out the method provides for a lamp which illuminates the region between the stamp receiver and the matrix. According to one formation of the invention for this there is provided an annular lamp which surrounds the stamp in the measuring position. The annular lamp may with the help of suitable measures be temporarily assembled on the stamp, for example with a suitable clamping device.

On the opposite side there is arranged the optical recorder which may for example be formed by an endoscope. An endoscope has the advantage that it comprises relatively small dimensions and by way of this may be introduced in the region between the matrix and the other pressing stamp (lower stamp).

It is to be understood that the described adjusting procedure may also be repeated, for example after fastening the stamp in the receiver.

BRIEF DESCRIPTION OF THE DRAWINGS

The invention is hereinafter described in more detail by way of the drawings.

DETAILED DESCRIPTION OF THE INVENTION

Figure 1:
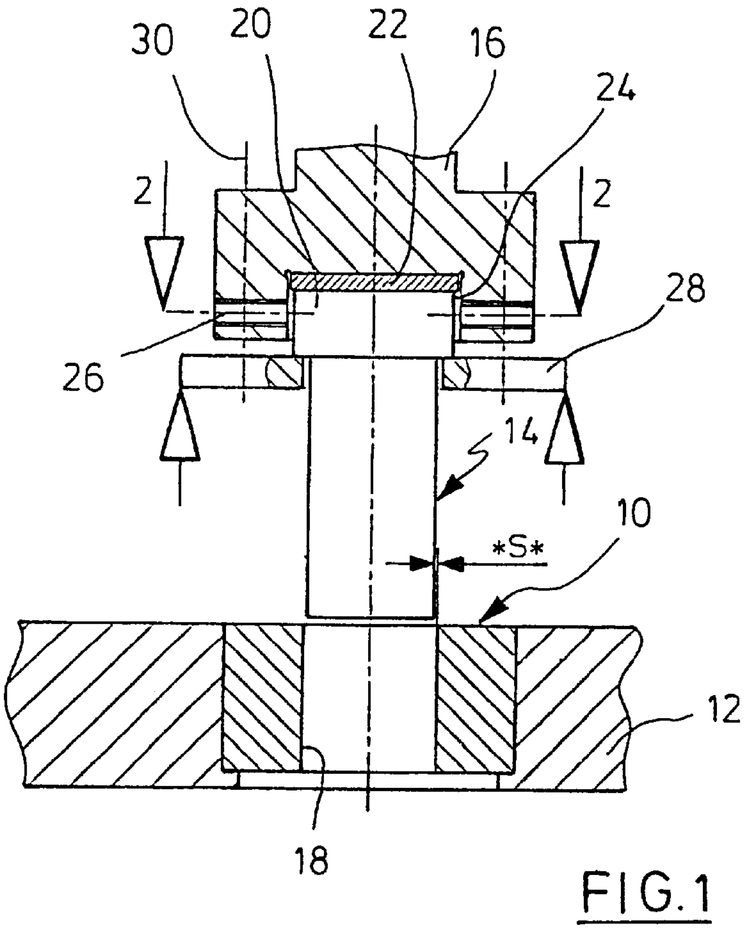
FIG. 1 shows a section through a part of a sintering press.

FIG. 1 shows a part of a sintering press, specifically a matrix 10 in a corresponding receiver 12 and an upper stamp 14 in a corresponding receiver 16. The accompanying lower stamp is not shown.

As can be recognized the matrix 12 comprises a smooth-walled through bore 18 whose diameter is slightly larger than the outer diameter of the stamp 14. With a coaxial alignment of the bore 18 and the stamp 14 there results a gap of the width S extending in the circumferential direction.

Figure 2:
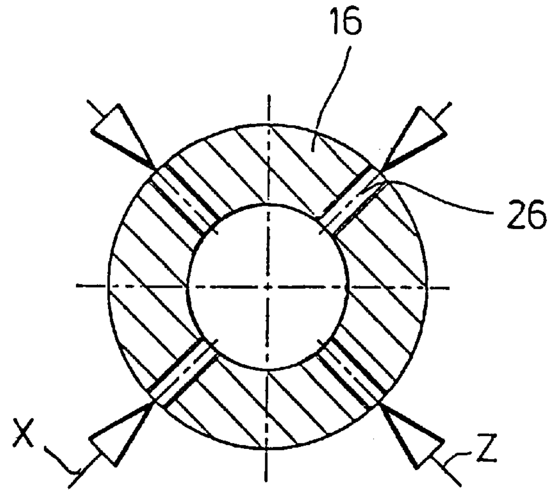
FIG. 2 shows a section through the representation according to FIG. 1 along the line 2—2.

A section 20 of the stamp 14, enlarged in diameter lies over a plate 22 against the floor of a recess 24 of the stamp receiver 16. As can be recognized the recess 24 is dimensioned larger than the outer diameter of the section 20. In the receiver 16 there are formed four threaded bores 26 displaced about 90° (see also FIG. 2), which may accommodate adjusting screws which cooperate with the section 20. With the one a of screws lying diametrically opposite the adjusting may be carried out in the X-axis (FIG. 2), and with the pair displaced diametrically opposite about 90 an adjustment in the Z-direction may be carried out. During such adjustment a clamping plate 28 which surrounds the stamp 14 and bears against the section 20 is only tightened slightly (the clamping screws are indicated by broken lines at 30).

Figure 3:
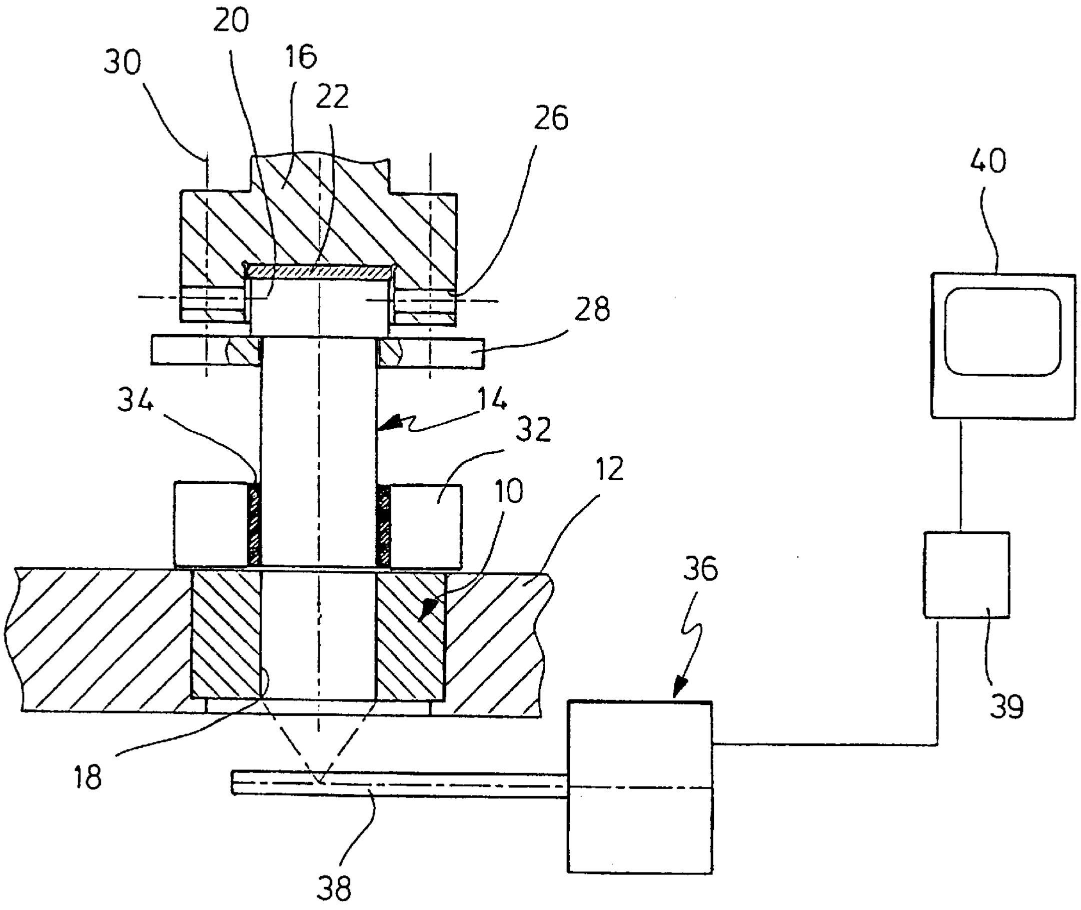
FIG. 3 shows the sintering press according to FIG. 1 during the adjusting procedures with a device for carrying out the method according to the invention.

In FIG. 3 it may be recognized how the stamp 14 is surrounded by a ring 32 which represents an annular lamp which illuminates a region between the ring 32 and the stamp 14 as is shown at 34. Similarly as in FIG. 1, the stamp in FIG. 3 is arranged shortly before immersing into the bore 18.

On the opposite side of the matrix 10 there is arranged a camera 36 with an optical recorder 38, e.g. an endoscope. The output of the camera 36 goes to a monitor 40 via a processing unit 39.

With the help of the optical arrangement 38 the bore 18 which is largely shadowed by the stamp 14 is recorded, with the exception of the gap S (FIG. 1). The operator may from now on recognize on the monitor 40 when this gap has approximately the same width over the circumference of the stamp. In order to achieve this the stamp 14 may be adjusted transversely to its axis in the above described way and manner until the gap is approximately uniform. Subsequently the stamp 14 with the help of the clamping plate 28 is tightened against the receiver 16. Where appropriate the monitoring may then be effected once again.

What is claimed is:

1. A method for adjusting a stamp relative to a bore of a matrix on sinter-pressing with the stamp constructed and arranged to move along an axis towards and away from the bore and being adjustable transverse to the axis, the method comprising the following steps:

moving the stamp along the axis towards a position shortly before entering into the bore;

illuminating the stamp;

receiving a picture of the matrix bore from an optical receiver, the optical receiver being positioned on the side of the matrix opposite to the stamp;

imaging the picture received by the receiver on a monitor, thereby showing the gap between the stamp and the bore; and adjusting the stamp transverse to the axis until an uniform gap is visible over the circumference of the stamp relative to the bore.

2. A device for carrying out the method according to claim 1, wherein there are arranged near to the matrix a lamp illuminating the stamp and on the opposite side of the matrix a camera.

3. A device according to claim 2, wherein there is provided an annular lamp surrounding the stamp.

* * * * *